United States Patent
Ruffa

Patent Number: 5,996,630
Date of Patent: Dec. 7, 1999

[54] SYSTEM FOR SUPPRESSING CAVITATION IN A HYDRAULIC COMPONENT

[75] Inventor: Anthony A. Ruffa, Hope Valley, R.I.

[73] Assignee: The United States of America as represented by the Secretary of the Navy, Washington, D.C.

[21] Appl. No.: 09/045,888

[22] Filed: Mar. 18, 1998

Related U.S. Application Data

[62] Division of application No. 08/807,128, Feb. 26, 1997, Pat. No. 5,884,650.

[51] Int. Cl.⁶ ........................................................ G05D 7/06
[52] U.S. Cl. .............................................. 137/828; 137/13
[58] Field of Search ........................................ 137/828, 13

[56] References Cited

U.S. PATENT DOCUMENTS 5,690,145  11/1997  Kuklinski et al. ...................... 137/828
5,803,106   9/1998  Cohen et al. ........................ 137/828 X

*Primary Examiner*—Gerald A. Michalsky
*Attorney, Agent, or Firm*—Michael J. McGowan; Prithvi C. Lall; Robert W. Gauthier

[57] ABSTRACT

A system is provided for suppressing flow-induced cavitation in a fluid flow. At least one acoustic transducer is coupled to the fluid flow in a region that is susceptible to the formation of cavitation bubbles. The transducer (or transducers) applies an acoustic field to the fluid flow in order to raise the cavitation threshold pressure of the fluid flow above the total local pressure including the pressure drop induced by the fluid flow and the pressure due to the acoustic field.

8 Claims, 1 Drawing Sheet

SYSTEM FOR SUPPRESSING CAVITATION IN A HYDRAULIC COMPONENT

This application is a division of application Ser. No. 08/807,128 filed Feb. 26, 1997, now U.S. Pat. No. 5,884,650.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to suppressing cavitation in a hydraulic component, and more particularly to a system using acoustic energy to suppress cavitation in a hydraulic component.

(2) Description of the Prior Art

Cavitation in and near hydraulic components (e.g., valves, pumps, injectors, conduits with sharp bends, etc.) of a fluid flow system is undesirable for a variety of reasons. The formation of cavitation bubbles adversely affects the performance of the system. The large release of heat energy brought about by the contraction and collapse of a vapor bubble can cause pitting on the inside surfaces of the hydraulic component. Over time, the pitting can affect the fluid flow and/or lead to failure of the hydraulic component. In addition, the formation and subsequent collapse of cavitation bubbles generates acoustic noise within the system.

Prior art approaches to preventing cavitation involve particular mechanical designs of the hydraulic component. This generally requires complete replacement of parts in an already existing fluid flow system. However, such replacement is not always practical or cost effective. In addition, specific mechanical designs might not be able to prevent cavitation in the event of changing flow conditions (e.g., pressure changes in the fluid flow due to velocity changes).

SUMMARY OF THE INVENTION

Accordingly, it is an object of the present invention to provide a system for preventing cavitation in or near a hydraulic component.

Another object of the present invention is to provide a system for preventing cavitation in or near a hydraulic component of an existing fluid-flow system without changing any mechanical components thereof.

Still another object of the present invention is to provide a system for preventing cavitation in or near a hydraulic component that adapts to changing flow conditions.

Other objects and advantages of the present invention will become more obvious hereinafter in the specification and drawings.

In accordance with the present invention, a system is provided for suppressing flow-induced cavitation in a fluid flow through a hydraulic component. At least one acoustic transducer is coupled to the fluid flow in a region of the hydraulic component that is susceptible to the formation of cavitation bubbles. The transducer (or transducers) applies an acoustic field to the fluid flow in order to raise the cavitation threshold pressure above the total local pressure including the pressure drop induced by the fluid flow and the local acoustic field. Since the cavitation pressure is above the total local pressure in the fluid flow, cavitation bubbles are prevented from forming. The hydraulic components do not require replacement with any specially designed components as the transducer can be affixed to the exterior of the components and the acoustic field directed through the component into the fluid flow. Where the acoustic field cannot be transferred through the hydraulic component, the transducer may be placed within the component itself. The system can also include the sensing of conditions of the fluid flow related to the formation of cavitation bubbles. Such conditions can include the acoustic noise associated with the formation of cavitation bubbles. The same (or different) transducer can be used to detect this acoustic noise. The acoustic field applied by the transducer can then be varied to adapt to the changing flow environment and to maintain cavitation suppression.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
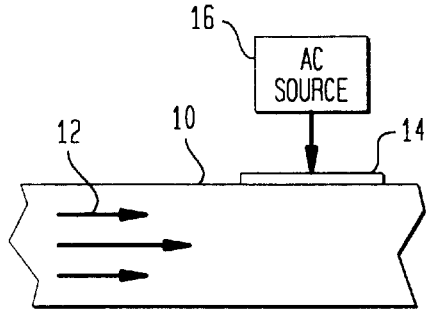
FIG. 1 is a schematic view of a hydraulic component with an acoustic transducer provided to suppress cavitation in accordance with the system of the present invention.

Referring now to the drawings, and more particularly to FIG. 1, the basics of the present invention will be explained. A hydraulic component, e.g., conduit 10, is shown with a fluid flow passing therethrough as represented by arrows 12. It is to be understood that conduit 10 is representative of any hydraulic component through which a fluid can pass. An acoustic transducer 14 is disposed so as to transfer acoustic energy to fluid flow 12 and is coupled to an AC source 16 for excitation thereof. Transducer 14 can be placed on the exterior of conduit 10 provided conduit 10 can transfer acoustic waves therethrough to fluid flow 12. Otherwise, transducer 14 can be placed within conduit 10 for direct coupling to fluid flow 12. For purpose of illustration, only one transducer 14 is shown. However, it is to be understood that a plurality of such acoustic transducers can be used, each of which could be excited by the same AC source 16 or by different AC sources.

Figure 2:
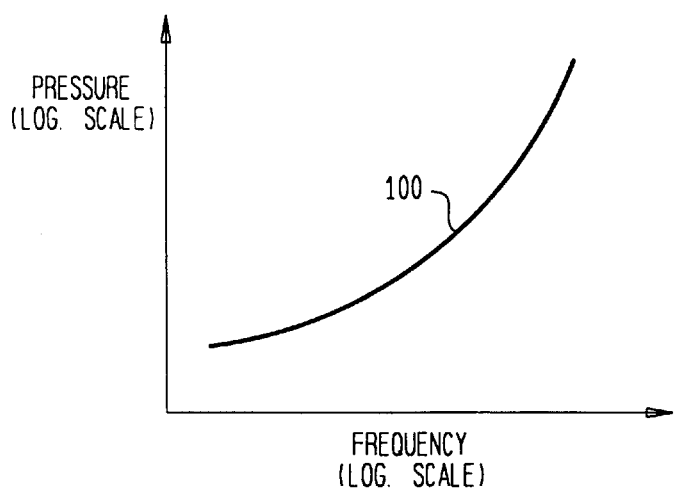
FIG. 2 is a logarithmic plot depicting, in general, the cavitation threshold curve as a function of frequency.

Flow-induced cavitation suppression in the present invention is accomplished as follows. As fluid flow 12 passes through medium 10, AC source 16 excites acoustic transducer 14 to create a high-amplitude acoustic field in fluid flow 12. The acoustic field applied by transducer 14 must raise the cavitation threshold pressure above the total pressure within fluid flow 12 in the region of conduit 10 where transducer 14 is located. In other words, the total pressure within fluid flow 12, i.e., ambient pressure minus the pressure drop due to fluid flow 12 plus the acoustic pressure applied by transducer 14, must be less than the cavitation threshold pressure. In general, cavitation threshold pressure increases as a function of frequency as shown by curve 100 in FIG. 2 which is a logarithmic plot of cavitation threshold pressure versus frequency. Thus, once the specifics of curve 100 are known for a particular hydraulic component: (e.g., conduit 10) and fluid flow 12, transducer 14 is driven to maintain operation below curve 100.

Figure 3:
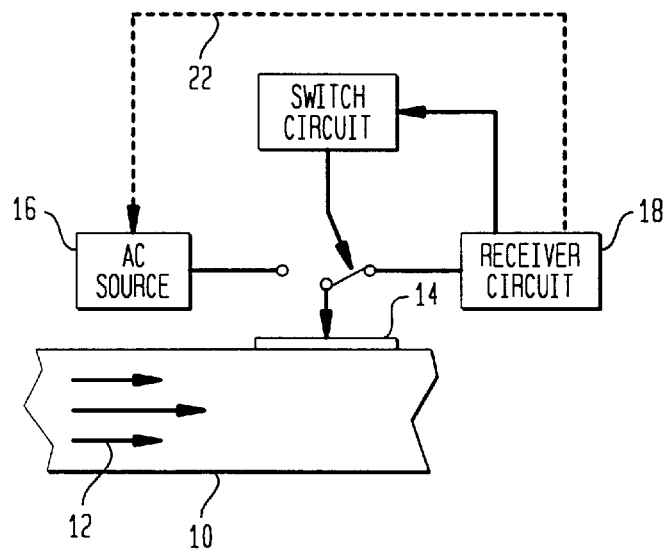
FIG. 3 is a schematic view of an embodiment that uses an acoustic transducer to both sense conditions related to cavitation and to suppress cavitation in accordance with the present invention.

To adapt to changing flow conditions, the system of the present invention can be implemented as shown in FIG. 3. Transducer 14 is switched between AC source 16 and receiver circuit 18 via switch control 20. In operation, switch control 20 would initially couple transducer 14 to receiver circuit 18 so that transducer 14 operates as an acoustic receiver. In this mode of operation, transducer 14 would sense acoustic conditions within fluid flow 12. Since the onset of cavitation produces noise, transducer 14 is thus set to detect such noise. At a threshold level of noise indicative of cavitation, receiver circuit 18 sends a control signal to switch control 20 to cause transducer 14 to be coupled to AC source 16. In this way, transducer 14 now operates as a transmitter to apply an acoustic field to fluid flow 12 in order to raise the cavitation threshold as described above. After a set period of time, switch control 20 can once again couple transducer 14 to receiver circuit 18 in order to determine if cavitation is continuing or if it has been suppressed. Should cavitation continue, the frequency of AC source 16 can be increased in accordance with a pre-set or adaptive scheme.

Another alternative is for switch control 20 to automatically and periodically switch transducer 14 between its receiver and transmitter modes of operation. If operation proceeded in this fashion, receiver circuit 18 would provide an activation signal (represented by dashed line 22) to AC source 16 indicating the presence of cavitation in fluid flow 12. In this way, excitation of transducer 14 as a transmitter would only occur when both switch control 20 coupled AC source 16 to transducer 14 and activation signal 22 was present. Once again, the frequency of AC source 16 can be increased in accordance with a pre-set or adaptive scheme until cavitation ceases.

Figure 4:
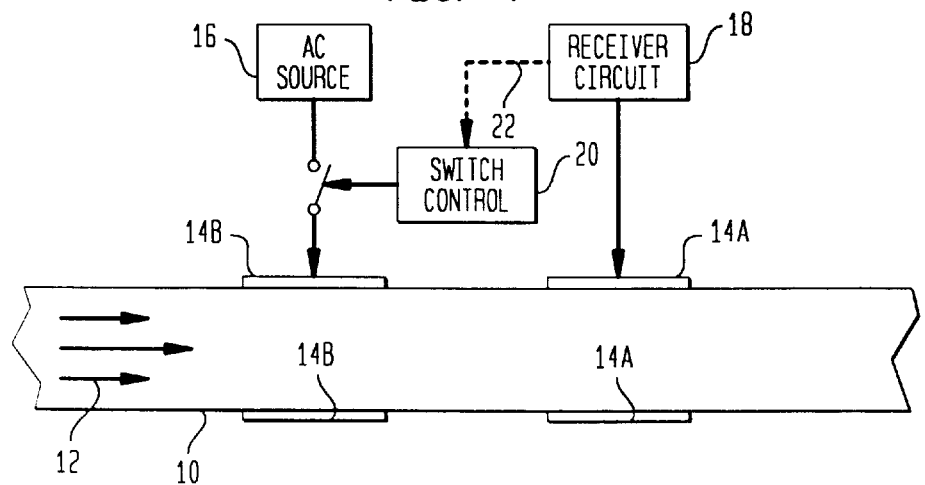
FIG. 4 is a schematic view of another embodiment that uses a plurality of acoustic transducers, some of which are dedicated to sense conditions related to cavitation and some of which are dedicated to suppress cavitation in accordance with the present invention.

Since it may be desirable to continually monitor acoustic conditions within fluid flow 12, the system of the present invention can be practiced using the embodiment depicted in FIG. 4. One or more acoustic transducers 14A are operated as dedicated receivers and are therefor directly and continually coupled to receiver circuit 18. One or more acoustic transducers 14B are operated as dedicated transmitters and are therefore directly coupled to AC source 16. In operation, receiver circuit 18 supplies activation signal 22 to switch control 20 only when acoustic noise associated with cavitation in fluid flow 12 is detected by transducers 14A. Thus, transducers 14B are only activated when cavitation commences. When activation signal 22 is no longer present, i.e., cavitation has ceased, transducers 14B are inactive.

The advantages of the present invention are numerous. The flow-induced cavitation suppression system can be implemented on new or existing fluid flow systems. The system adapts to changing flow conditions and is therefore more versatile then conventional mechanical "fixes". Since there are no mechanical components, this system of flow-induced cavitation suppression is robust. Further, since it will generally not be necessary to introduce any of the system components into the fluid flow, the system of the present invention should have no negative impact on the fluid flow.

It will be understood that many additional changes in the details, materials and arrangement of parts, which have been herein described and illustrated in order to explain the nature of the invention, may be made by those skilled in the art within the principle and scope of the invention as expressed in the appended claims.

What is claimed is:

1. A system for suppressing flow-induced cavitation in a fluid flow through a hydraulic component, comprising:

at least one acoustic transducer coupled to said fluid flow in a region of said hydraulic component for generating an acoustic signal in response to the formation of cavitation bubbles in said fluid flow;

a receiver circuit coupled to said at least one acoustic transducer for generating a control signal in response to said acoustic signal;

an AC source; and a switch control coupled to said AC source and said receiver circuit for coupling said AC source to said at least one acoustic transducer in response to said control signal, wherein an acoustic field is applied to said fluid flow in said region by said at least one acoustic transducer coupled to said AC source.

2. A system as in claim 1 wherein:

said at least one acoustic transducer comprises a single acoustic transducer;

said receiver circuit is coupled to said single acoustic transducer for operating said single acoustic transducer as a receiver when coupled thereto for sensing conditions related to the formation of said cavitation bubbles; and said switch control uncouples said single acoustic transducer from said receiver circuit and couples said single acoustic transducer to said AC source.

3. A system as in claim 1 wherein:

said at least one acoustic transducer comprises a plurality of acoustic transducers;

said receiver circuit is coupled to at least one of said plurality of acoustic transducers for operating said at least one of said plurality of acoustic transducers as an acoustic receiver to acoustically sense the formation of said cavitation bubbles in said region; and said switch control couples others of said plurality of acoustic transducers to said AC source when said at least one of said plurality of acoustic transducers operating as an acoustic receiver acoustically senses the formation of said cavitation bubbles in said region, said acoustic field being applied to said fluid flow in said region by said others of said plurality of acoustic transducers.

4. A system as in claim 1 wherein said AC source is a variable frequency source.

5. A system for suppressing flow-induced cavitation in a fluid flow through a hydraulic component, comprising:

at least one acoustic transducer coupled to said fluid flow in a region of said hydraulic component; and means for operating said at least one acoustic transducer as a receiver until conditions related to the formation of cavitation bubbles are detected in said region, and for operating said at least one acoustic transducer as a transmitter to apply an acoustic field to said fluid flow in said region once said conditions related to the formation of said cavitation bubbles are detected.

6. A system as in claim 5, wherein said at least one acoustic transducer comprises a single acoustic transducer.

7. A system as in claim 5, wherein:

said at least one acoustic transducer comprises a plurality of acoustic transducers;

said means operates at least one of said plurality of acoustic transducers as said receiver to acoustically sense the formation of said cavitation bubbles in said region; and said means operates others of said plurality of acoustic transducers as said transmitter when said at least one of said plurality of acoustic transducers operating as said receiver acoustically senses the formation of said cavitation bubbles in said region, said acoustic field being applied to said fluid flow in said region by said others of said plurality of acoustic transducers.

8. A system as in claim 7, wherein said means continuously operates said at least one of said plurality of acoustic transducers as said receiver.

* * * * *